US012601649B2

(12) United States Patent
Mastrogiacomo et al.

(10) Patent No.: US 12,601,649 B2
(45) Date of Patent: Apr. 14, 2026

(54) TRANSDUCER COMPRISING A DIAPHRAGM FOR USE WITH HYDROGEN-CONTAINING FLUID MEDIA

(71) Applicant: Kistler Holding AG, Winterthur (CH)

(72) Inventors: Giovanni Mastrogiacomo, Zurich (CH); Hans Beat Maerki, Kollbrunn (CH); Thomas Cadonau, Kirchberg (CH)

(73) Assignee: Kistler Holding AG, Winterthur (CH)

( * ) Notice: Subject to any disclaimer, the term of this patent is extended or adjusted under 35 U.S.C. 154(b) by 421 days.

(21) Appl. No.: 18/083,917

(22) Filed: Dec. 19, 2022

(65) Prior Publication Data

US 2023/0204446 A1      Jun. 29, 2023

(30) Foreign Application Priority Data

Dec. 23, 2021   (EP) ..................................... 21217511
Oct. 24, 2022   (EP) ..................................... 22203343

(51) Int. Cl.
 *G01L 7/08*       (2006.01)
 *G01L 9/00*       (2006.01)
 *G01L 19/06*      (2006.01)
(52) U.S. Cl.
 CPC .................. *G01L 7/08* (2013.01); *G01L 9/00* (2013.01); *G01L 9/0044* (2013.01); *G01L 19/0627* (2013.01); *G01L 19/0645* (2013.01)
(58) Field of Classification Search
 CPC ... G01L 9/00; G01L 9/044; G01L 7/08; G01L 9/0041–005; G01L 9/0044
 See application file for complete search history.

(56) References Cited

U.S. PATENT DOCUMENTS

| | | | | |
|---|---|---|---|---|
| 4,809,589 | A * | 3/1989 | Bertrand | .................... F16J 3/02 73/715 |
| 7,150,198 | B2 * | 12/2006 | Kaneko | ............... G01L 19/0627 73/756 |
| 9,835,508 | B2 * | 12/2017 | Kazama | ................ G01L 9/0055 |
| 10,451,506 | B2 * | 10/2019 | Kobayashi | ............ G01L 9/0044 |

(Continued)

FOREIGN PATENT DOCUMENTS

| | | | | |
|---|---|---|---|---|
| DE | 202015103451 U1 * | 9/2015 | ......... | G01L 19/0076 |
| DE | 102014104113 A1 * | 10/2015 | ......... | G01L 19/0092 |
| EP | 1619487 A1 | 1/2006 | | |

(Continued)

OTHER PUBLICATIONS

"Martensitic stainless steel" by Wikipedia as downloaded by the Wayback Machine Internet Archive on Jun. 10, 2021.*

(Continued)

*Primary Examiner* — Justin N Olamit
(74) *Attorney, Agent, or Firm* — Dority & Manning, P.A.

(57) ABSTRACT

A transducer for determining a pressure of a hydrogen-containing fluid medium confined in a first space includes a pressure side end configured to be disposed facing the fluid medium. The transducer includes a housing, which defines a second space, and a measuring arrangement disposed in the second space. The pressure side end includes a diaphragm configured and disposed for hermetically separating the first space from the second space. The diaphragm includes a metallic material that is made of a high-alloy martensite.

19 Claims, 3 Drawing Sheets

(56)          References Cited

U.S. PATENT DOCUMENTS

| | | | |
|---|---|---|---|
| 12,066,349 B2 * | 8/2024 | Vasic | .................... G01L 9/0075 |
| 2005/0109114 A1 | 5/2005 | Wilson | |

FOREIGN PATENT DOCUMENTS

| | | |
|---|---|---|
| EP | 1619488 A2 | 1/2006 |
| EP | 3293279 A1 | 3/2018 |
| EP | 3327417 A1 | 5/2018 |
| JP | S 62-18004 A | 8/1987 |
| JP | H 07260612 A | 10/1995 |
| JP | 2006038538 A | 2/2006 |

OTHER PUBLICATIONS

"Precipitation hardening" by Wikipedia as downloaded by the Wayback Machine Internet Archive on May 29, 2019.*

"Martensite and the Control of Retained Austenit" by Voort, May 29, 2014.*

"ValbrunaNordic" by Valbruna as downloaded by the Wayback Machine on Sep. 10, 2021.*

"ValbrunaNordic" by Valbruna, English translation, date unknown.*

European Search Report English translation for EP application No. 20217511.1.

JP Office Action with translation, Feb. 1, 2024, 4 pages.

DIN EN ISO 6892-1, Metallic materials—Tensile testing—Part 1: Method of test at room temperature, 2019 (abstract only).

DIN EN 10027-2, Designation systems for steels—Part 2: Numerical system, 2015 (abstract only).

DIN EN ISO 1302, Chemicals used for treatment of water intended for human consumption—Aluminum-based coagulants—Analytical methods, 1999 (abstract only).

ASTM E 975, Standard Practice for X-ray Determination of Retained Austenite in Steel with Near Random Crytallographic Orientation (abstract only).

Vytvyts'Kyi, V. I.: Strength of Alloys Based on Iron, Nickel, and Titanium in High-Pressure Hydrogen, Materials Science, Kluwer Academic Publishers-Consultants Bureau, NE, vol. 40, No. 6, Nov. 1, 2004 (Nov. 1, 2004), pp. 717-730, ISSN: 1573-885X, DOI: 1 0.1 007/S1 1003-005-0108-8 (abstract only).

Dubbel—Taschenbuch für den Maschinenbau, 14th edition, Springer-Verlag 1981, chapter 3.1.4 (abstract only).

Pirlog, Madalina, and P. K. Pranzas. Characterization of Copper Precipitates In Fe—Cu Alloys with Small-Angle Neutron Scattering, Fraunhofer Institut für zerstörungsfreie Prüfverfahren, Saarbrücken, Germany, 4 pages.

Metallkunde, E. Hornbogen and H. Warlimont, 4th edition, Springer Verlag 200, chapter 15.2 (abstract only).

Werkstoffkunde Stahl—Band 1, Verein Deutscher Eisenhüttenleute (editor), Springer Verlag 1984, chapter B6.4.4 (abstract only).

Rechnerischer Festigkeitsnachweis für Maschinenbauteile—FKM-Richtlinie, published by VDMA-Verlag, 7th edition 2020 (abstract only).

German Search Report with English translation for EP application No. 22203343.3, May 2, 2023, 12 pages.

CN Office Action with Translation, Jul. 8, 2025.

2nd EP Search Report, Feb. 5, 2023.

* cited by examiner

TRANSDUCER COMPRISING A DIAPHRAGM FOR USE WITH HYDROGEN-CONTAINING FLUID MEDIA

TECHNICAL FIELD

The present invention relates to a transducer comprising a diaphragm for use with hydrogen-containing fluid media.

BACKGROUND OF THE INVENTION

A diaphragm separates a fluid medium contained in a first space from a second space. In the field of pressure measurement technology, transducers often comprise a diaphragm that separates a measuring arrangement, for example a transducer element, from the fluid medium, for example a gaseous and/or liquid measuring medium the pressure of which is to be determined. For this purpose, a diaphragm usually comprises a surface having a first dimension and a second dimension wherein the first and second dimensions are largely perpendicular to a longitudinal axis. The diaphragm has a thickness which is also called wall thickness in a third dimension that extends parallel to the longitudinal axis.

In the following, a fluid medium is understood to mean a hydrogen-containing fluid medium that comprises at least 1 vol % (percent by volume) of hydrogen.

Generally, the surface of the diaphragm comprises a region that is in contact with the fluid medium in a first space. In the case of a pressure transducer, the pressure of the fluid medium that acts onto this region of the diaphragm is transmitted with as little loss as possible to a pressure transducer element, shortly referred to as the transducer element. To ensure that the effect of the diaphragm on the sensitivity of a measuring arrangement that comprises a pressure transducer element is not too high, the region of the diaphragm which is directly exposed to the fluid medium must exhibit the highest possible degree of resilience or the lowest possible degree of stiffness. It is essential, however, that the material in this region with low stiffness is not deformed in an irreversible manner by the measuring pressure. If materials with a yield strength of about 400 MPa (megapascals) are used, the diaphragm must be fabricated with sufficient thickness not to be irreversibly deformed. The diaphragm may additionally comprise regions with higher thickness by which the diaphragm is connected to a transducer housing, for example. These regions with higher thickness may also contribute to the stability of the diaphragm. In this case, the regions with higher thickness are not used for transmitting a pressure of the fluid medium to the pressure transducer element.

The yield strength of a metallic material is determined according to standard DIN EN ISO 6892-1. It corresponds to the $R_{P\,0.2.}$ value.

The surface of a diaphragm may extend substantially along the first dimension and the second dimension but may be partially curved in the direction of the longitudinal axis.

Diaphragms can also separate a fluid medium from other types of transducer elements, such as for example temperature transducers in which a temperature transducer element is separated from the fluid medium by a diaphragm. In this case, the temperature of the fluid medium is transmitted through the diaphragm to a temperature transducer element. Also in this case, the wall thickness of the diaphragm should be as small as possible to obtain the highest possible heat transfer coefficient.

If the fluid medium contains hydrogen, the diaphragm must be both impermeable for and resistant to hydrogen. Therefore, commercially available, hydrogen-resistant and polycrystalline metals, such as the grade 1.4404 austenitic steel (also known as grade 316 L) having a yield strength of about 400 MPa at room temperature or the nickel-based alloy 2.4819 (also known as C-276) also having a yield strength of about 400 MPa at room temperature, are often used for diaphragms that are also heat-resistant at above 200° C. These materials are characterized by an average grain size of more than 20 µm. These coarse-grained, polycrystalline metals are not useful as materials for thin diaphragms with a thickness of less than 500 µm since they do not permit the fabrication of thin-walled diaphragms due to their low yield strength. A thin diaphragm would rapidly become irreversibly deformable. In addition, the material will not exhibit isotropic behavior due to the small number of crystal grains in the thin-walled region of the diaphragms. Furthermore, the diffusion path for molecular and/or atomic hydrogen along the grain boundaries between the crystal grains is relatively short through coarse-grained regions. This is a disadvantage because in this way hydrogen can easily diffuse through the diaphragm along a short path.

For metals and alloys, the term structure refers to the microstructure of the material. One structure is martensite, for example.

The designation 1.4404 as well as other material grade numbers mentioned in the following correspond to DIN EN 10027-2.

If molecular and/or atomic hydrogen penetrates a metallic material, this will lead to so-called hydrogen embrittlement. As a result, the material may be subject to a risk of brittle fracture when a load is applied thereon.

Hydrogen embrittlement is understood to mean a change in the ductility and strength of a metal or metal alloy due to the penetration and subsequent incorporation of hydrogen into the lattice structure of the metal or metal alloy. As a result, hydrogen-induced cracking can occur which limits the use of materials susceptible to hydrogen embrittlement in applications where they come into contact with hydrogen.

It is well known that a metal or metal alloy with high strength is more prone to hydrogen embrittlement than a metal with lower strength.

The materials made of grade 1.4404 steel (also known as grade 316 L) and alloy 2.4819 (also known as C-276) are generally considered to be corrosion resistant. They exhibit a low yield strength and, therefore, can be plastically deformed by applying lower forces as compared to materials with higher yield strengths. To compensate for this disadvantage, diaphragms are often manufactured with high thicknesses of more than 500 µm. However, this is disadvantageous due to the high inertial mass of a thick diaphragm. Furthermore, a thick diaphragm also has a higher stiffness.

In a known embodiment, pressure sensors comprise a space behind the diaphragm that is filled with a fluid pressure transmission medium. In this embodiment, the risk of an irreversible plastic deformation of the diaphragm is lower since the fluid pressure transmission medium counteracts a deformation of the diaphragm. The fluid pressure transmission medium, for example an oil with little compressibility, transmits the pressure acting on the diaphragm to a measuring element placed at a distance from the diaphragm. Also in this case, the diaphragm must transmit the pressure with as little loss as possible, i.e. the diaphragm should advantageously be designed in a thin manner. If the fluid medium to be measured contains hydrogen, hydrogen will accumulate in the fluid pressure transmission medium over time which increases the volume and causes the diaphragm to bulge outward. The diaphragm is inflated by the hydrogen that has diffused through the diaphragm. This may on the one hand damage the diaphragm and on the other hand changes the pressure conditions in the vicinity of the measuring element. The diffusion of molecular and/or atomic hydrogen through the diaphragm has a negative effect on the long-term stability of the sensor.

US20050109114A1, which is hereby incorporated herein in its entirety for all purposes by this reference, describes a transducer comprising a diaphragm made of alloy 2.4819 (also known as C-276). Although the material itself is considered to be corrosion resistant, it is not impervious to hydrogen due to the small thickness of the diaphragm. US20050109114A1 suggests to achieve the insufficient resistance against hydrogen by coating the diaphragm.

OBJECTS AND SUMMARY OF THE INVENTION

It is an object of the present invention to improve a diaphragm in such a way that the disadvantages mentioned above are reduced. It is a further object of the invention to obtain improved resistance of the diaphragm against corrosion by atomic and/or molecular hydrogen.

These objects and others have been achieved by the features described hereinafter.

The invention relates to a transducer for determining a pressure of a hydrogen-containing fluid medium. The hydrogen-containing fluid medium is arranged in a first space. The transducer comprises a pressure side end that faces the fluid medium. The transducer comprises a housing that has a second space. The transducer comprises a measuring arrangement. The measuring arrangement is arranged in the second space. At the pressure side end, the transducer comprises a diaphragm for hermetically separating the first space containing the hydrogen-containing fluid medium from the second space. The diaphragm comprises a metallic material. The metallic material has a martensitic structure. According to the invention, the metallic material of the diaphragm is made of a high-alloy martensite.

The diaphragm is designed for separating a space comprising a hydrogen-containing fluid medium from another space. A hydrogen-containing fluid medium comprises at least 1 vol % of hydrogen and is hereinafter also referred to as corrosive or as a corrosive fluid medium.

Corrosion is generally understood to be a measurable change in a material. Corrosion may occur as a result of exposure to a variety of substances. Thus, it is known that corrosion of metallic materials occurs in connection with various alkalis or acids, gases such as hydrogen or oxygen, salt water and many other substances. For the purposes of this description, however, corrosion is understood to mean corrosion by atomic or molecular hydrogen, unless otherwise specified. The diaphragm according to the invention must have a low susceptibility to corrosion due to hydrogen.

Surprisingly, the fine-grained steel with a martensitic structure, in short consisting of martensite, exhibits a low susceptibility to hydrogen embrittlement and therefore shows some hydrogen resistance. Therefore, the metallic material of the diaphragm is resistant to hydrogen corrosion.

The martensitic structure is characterized by an average grain diameter of less than 20 μm and are therefore suitable for the production of thin-walled diaphragms with thicknesses of less than 500 μm. Due to the average grain diameter of less than 20 μm, the component exhibits isotropic physical properties which is advantageous when the diaphragm is in use. If this were not the case, directional effects would occur in a detrimental manner when applying a load on the diaphragm, for example. In addition, in contrast to coarse-grained materials the diffusion of hydrogen through the diaphragm is reduced by the numerous grain boundaries of the fine-grained material. The use of martensite in the context of hydrogen-containing fluid media is surprising since martensite is generally considered unsuitable for use in contact with hydrogen-containing fluid media due to its relatively high strength. VYTVYTS'KYI V I: "Strength of Alloys Based on Iron, Nickel, and Titanium in High-Pressure Hydrogen," MATERIALS SCIENCE, KLUWER ACADEMIC PUBLISHERS-CONSULTANTS BUREAU, NE, vol. 40, no. 6, Nov. 1, 2004 (2004-11-01), pages 717-730, ISSN: 1573-885X, DOI: 1 0.1 007/S1 1003-005-0108-8 describes a "catastrophic degradation in hydrogen".

It should be understood that it is not required to fabricate the entire diaphragm in a thickness of less than 500 μm. Thus, the diaphragm may also have regions of higher thickness by which the diaphragm is connected to a transducer housing, for example. The regions of higher thickness may also contribute to the stability of the diaphragm. However, it is important that the diaphragm comprises thin-walled regions with lower stiffness.

Advantageously, the metallic material of the diaphragm is a high-alloy martensite with partially coherent or incoherent precipitates.

The term "high-alloy" is used in accordance with Dubbel-Taschenbuch für den Maschinenbau, 14th edition, Springer-Verlag 1981, chapter 3.1.4 to mean a martensite with an alloy content>5 wt. % (percent by weight). The alloy content is the content by mass of an alloying element. As a result, the transducer exhibits an increased overall corrosion resistance. In this context, alloying elements are understood to mean exclusively Cr (chromium), Mo (molybdenum) or Ni (nickel). These alloying elements increase the overall corrosion resistance. This also results in an increased resistance against hydrogen corrosion.

A martensite with partially coherent precipitates or a martensite with incoherent precipitates is understood to mean a martensite in which so-called precipitates are formed by heat treatment, precipitation hardening, also called age hardening or particle hardening, or particle hardening. Partially coherent or incoherent precipitates in the sense of the present specification are described in Werkstoffkunde-Stahl-Band 1, Verein Deutscher Eisenhüttenleute (editor), Springer Verlag 1984 or in Pirlog, Madalina, and P. K. Pranzas. "CHARACTERIZATION OF COPPER PRECIPITATES IN FE-CU ALLOYS WITH SMALL-ANGLE NEUTRON SCATTERING."

In precipitates, atoms of an alloying element form accumulations called aggregates. This is accompanied by a change in the hardness of the material. The relationship between the hardness of a material with the so-called thermal aging time is well known. This is often shown in the form of a diagram in which the hardness of a material is plotted against the thermal aging time. The hardness increases with increasing thermal aging time up to a global maximum where maximum hardness is reached and then decreases again. The thermal aging time is a specified time that indicates the duration of the thermal treatment at a specific temperature. The maximum hardness $H_{max}$ of a material is reached at a thermal aging time t (maximum hardness). So-called partially coherent precipitates are present at this maximum hardness $H_{max}$. Incoherent precipitates are present with longer thermal aging times. Preferentially, the precipitates form at grain boundaries within the material as described in Metallkunde, E. Hornbogen and H. Warlimont, 4th edition, Springer Verlag 2001.

Incoherent and partially coherent precipitates act as hydrogen sinks. Hydrogen accumulates at hydrogen sinks. This prevents the accumulated hydrogen from penetrating further into the material. The mobility of the hydrogen is reduced compared to a material with coherent precipitates since coherent precipitates are located within a grain whereas hydrogen is preferably movable along grain boundaries in the material.

It is particularly preferred that the material of the diaphragm consists of a high-alloy lath martensite with partially coherent and/or incoherent precipitates. A lath martensite is understood to mean a material described in Werkstoffkunde-Stahl-Band 1, Verein Deutscher Eisenhüttenleute (editor), Springer Verlag 1984, chapter B6.4.4 or in Metallkunde, E. Hornbogen and H. Warlimont, 4th edition, Springer Verlag 2001, chapter 15.2. In its structure, a lath martensite comprises flattened laths which are arranged in layers. lath martensite is also known as block martensite or massive martensite or as "lath-martensite" or "blokky-martensite" or "massive-martensite". It has been shown that the mobility of hydrogen in a lath martensite is further reduced as compared to a martensite without laths.

Advantageously, the metallic material of the diaphragm has a chromium content of at least 10 wt. % and a nickel content of at least 4 wt. %. Metallic materials with lower contents of each of these elements are less resistant to overall corrosion. The proportion by weight of non-metals is advantageously less than 0.20 wt. %. This is advantageous because a higher proportion by weight of non-metals leads to matrix defects and a more brittle material. This is disadvantageous for the production of diaphragms. Brittle materials have a lower resistance to unstable crack propagation.

Advantageously, the metallic material of the diaphragm has a yield strength of at least 600 MPa and at most 1500 MPa. The high yield strength of more than 600 MPa prevents irreversible plastic deformation of the metallic material. In order to keep the stiffness of the diaphragm low, the yield strength of the metallic material must not exceed 1500 MPa for a given geometry of the diaphragm with a thickness of less than 500 μm. Usually, a typical diameter of a diaphragm of a pressure transducer is between 2.0 mm and 20 mm.

Advantageously, the metallic material of the diaphragm exhibits a Rockwell C hardness of between 38 and 50 HRC. At a lower hardness the material contains coherent precipitates. If the hardness is too high, the susceptibility to hydrogen embrittlement will increase again.

All parameters such as the yield strength, stiffness, tensile strength, hardness, etc. are given at room temperature unless explicitly stated otherwise. Room temperature is understood to mean a temperature of 20° C.

The metallic material of the diaphragm advantageously has an average grain size of less than 20 μm. As a result, the material exhibits isotropic physical properties even with delicate structures. In addition, a diffusion path along the grain boundaries is considerably longer as compared to a material that has a coarse-grained structure with a mean grain size of more than 20 μm. As a result, hydrogen can penetrate the material only poorly along the grain boundaries or diffuse through the material due to the long diffusion path. Due to the small grain size the material is suitable for the production of thin-walled diaphragms. Furthermore, since even thin structures with a thickness of less than 500

μm have several layers of grains the metallic material is also hermetically sealed against hydrogen. For the same reason, thin structures exhibit isotropic physical properties.

The term hermetically sealed is intended to mean a leakage rate for helium of less than $10^{-6}$ mbar l/s (millibar liters per second).

It has been shown that when the metallic material of the diaphragm has a residual austenite content of less than 30 vol. % (percent by volume) the advantages of a diaphragm made of the metallic material described above continue to exist. Preference is given to a residual austenite content of the metallic material of between 0 vol. % and 10 vol. %. The residual austenite content is determined according to standard ASTM E 975.

Particularly advantageous, the diaphragm comprises a metallic material having a residual austenite content of greater than 1% by volume. It has been shown that hydrogen diffusing through the metallic material at grain boundaries preferentially accumulates at residual austenite. The residual austenite thus is a hydrogen sink in which hydrogen is retained and from which it cannot escape. Thus, the hydrogen retained at the residual austenite is unable to diffuse more deeply into the metallic material. A residual austenite content of greater than 1 vol. % reduces the mobility of the hydrogen. This makes the diaphragm more resistant to corrosion. The reduced hydrogen mobility within the metallic material of the diaphragm also reduces the leakage rate for atomic or molecular hydrogen.

The diaphragm is made of a material that is not permeable to atomic or molecular hydrogen. For the purposes of this description, a material is not permeable if a diaphragm with 500 μm thickness made of this material has a leakage rate for atomic or molecular hydrogen of less than $10^{-6}$ mbar l/s wherein the diaphragm thickness is at most 500 μm. The diaphragm has a surface size of at least 1 mm². This is advantageous as it prevents hydrogen from accumulating in the second space. An accumulation of hydrogen in the second space could lead to bulging of the diaphragm. This might damage the diaphragm. In addition, hydrogen enrichment may lead to an increase of the pressure in the second space which alters the pressure conditions around the measuring element. This may falsify a pressure measurement.

Particularly advantageous for use as the metallic material is quenched and tempered grade 1.4418 steel having a yield strength of less than or equal to 900 MPa at room temperature. Particularly advantageous for use as the metallic material is also precipitation-hardened grade 1.4534 steel having a yield strength of less than or equal to 1500 MPa. Particularly advantageous for use as the metallic material further is precipitation-hardened grade 1.4614 steel having a yield strength of less than or equal to 1500 MPa. Further advantageous is grade 1.4548 steel having a yield strength of less than or equal to 1500 MPa.

Typically, the metallic material has a coefficient of thermal expansion between $10 \cdot 10^{-6}$ K$^{-1}$ and $12 \cdot 10^{-6}$ K$^{-1}$ in the temperature range between 20° C. and 100° C.

Advantageously, the metallic material comprises a surface which faces the fluid medium and which surface is free of depressions, punctures, holes or ribs in order to keep the tendency of adsorption of the fluid medium low. This results in poorer adsorption of the fluid medium to the diaphragm since defects in the surface, so-called surface defects, promote adsorption. The advantage is an increased resistance to surface corrosion by the fluid medium.

It is particularly advantageous when the surface of the metallic material that faces the fluid medium shows a corrugation with the notch stress caused by this corrugation being less than 1500 MPa.

Corrugation is defined as a deviation of the plane of a subsection of the surface from the plane of an adjacent subsection of the surface. In the case of diaphragms having a circular surface in the region which is in direct contact with the fluid medium during use, concentric circular corrugations in the surface of the diaphragm are known to increase the resilience of the diaphragm. However, depending on the radius selected such corrugations lead to notch stress in the material. Notches in the context of notch stress do not have to be pointed but are also given by rounded surfaces, by changes in cross-section, by bores and the like. Therefore, the notch stress is dependent on the geometric dimensions of the diaphragm or notch, respectively, and on the metallic material of the diaphragm. The notch stress is determined by means of finite element analysis using the geometric dimensions and material parameters such as the tensile strength, elasticity, Young's modulus, yield strength ($R_{p0.2}$), etc. The determination is described for example in "Rechnerischer Festigkeitsnachweis für Maschinenbauteile-FKM-Richtlinie", published by VDMA-Verlag, 7th edition 2020 or in "Betriebsfestigkeit mit FEM: schnell verstehen & anwenden" by Stefan Einbock and Florian Mailänder, 2018. A high notch stress of the metallic material favors crack formation. A notch or a crack has a negative effect on the corrosion resistance of a surface. Corrosive elements of a fluid medium may penetrate in a detrimental manner through the crack into the material structure and damage the material along the crack. This is also known as stress corrosion cracking.

Alternatively, for a circular diaphragm with a thickness of less than 500 μm, the surface of the diaphragm may be, at least in the region which is in contact with the fluid medium during use, advantageously designed with a corrugation such that transitions between two non-parallel planes with radii of at least 100 μm and/or having facets of at least 30 μm. By "facet" is meant a flattening of a 90 degree corner, typically at a 45 degree angle. This reduces stress corrosion cracking in comparison to diaphragms where the transitions between two non-parallel planes have smaller dimensions.

Advantageously, the diaphragm exhibits at least in the region which is in contact with the fluid medium during use a surface quality with a mean roughness index Ra of less than 0.8 μm. The mean roughness index Ra is determined according to DIN EN ISO 1302. If the surface exhibits a higher mean roughness index, a larger region will be exposed to the fluid medium on which atoms or molecules of the fluid medium may adsorb in comparison to a surface having a lower mean roughness index. Furthermore, a surface exhibiting a mean roughness index below 0.8 μm has fewer surface defects in the crystal lattice of the metallic material compared to a surface having a higher mean roughness index. Defects promote adsorption and chemical reactions at the surface and lead to faster corrosion of the surface. A low mean roughness index of less than 0.8 μm thus increases the corrosion resistance of the surface.

Preferably, the metallic material of the diaphragm is produced from an austenite by diffusionless transformation.

The diaphragm may have a coating on the side facing the fluid medium. The foregoing description of the properties and characteristics of the diaphragm in its various embodiments, in particular of the metallic material and the surface, is thereby explicitly compatible with the coating. A coating may increase the corrosion resistance of the diaphragm further.

The diaphragm is suitable for comprising an inner coating. Since the inner coating is not in contact with the fluid medium it may differ in physical and chemical parameters from any coating that may be present on the side of the diaphragm facing the fluid medium. Thus, for example, the inner coating may be designed in an electrically insulating manner. In addition, the coating on the side of the diaphragm facing the fluid medium may also have a resistance to other substances that the inner coating does not need to exhibit.

A measuring arrangement for determining a pressure of a fluid medium is, for example, at least one piezoelectric crystal which generates piezoelectric charges as a function of a pressure applied to the diaphragm. In one embodiment, the piezoelectric crystal is arranged in a preloading sleeve which exerts a preload onto the piezoelectric crystal. In this way, both negative and positive pressure changes can be detected. Alternatively, a measuring arrangement may also contain capacitive measuring elements that detect a mechanical deformation as a change in capacitance.

Alternatively, a measuring arrangement may also comprise piezoresistive measuring elements or strain gauge strips, also referred to as strain gauges or strain gages, which detect a mechanical deformation as a change in electrical resistance. Other measuring arrangements are known to the skilled person which are used in transducers for determining the pressure of a fluid medium.

The diaphragm is located at the pressure side end of the housing and hermetically separates the measuring arrangement from the fluid medium. The housing and the diaphragm are connected with a material bonding connection. A material bonding connection is, for example, a welded connection or a soldered connection. A material bonded connection by means of an adhesive may also be conceived.

The diaphragm comprises a first region which is in contact with the fluid medium during use. The diaphragm comprises a second region which is not in contact with the fluid medium during use. The material bonding connection is positioned in the second region. Material bonding connections in the form of soldered or welded joints usually have a higher number of cracks or pores. Even when the material bonding connection is achieved by an adhesive, the adhesive may be damaged by the fluid medium. Therefore, the connection by adhesive is advantageously positioned in the second region which is not exposed to the fluid medium.

When the diaphragm has a coating, the coating is disposed at least across the entire first region but may also extend at least partially across the second region.

As defined herein, a second region is not in contact with the fluid medium when the concentration of corrosive constituents of the fluid medium in the second region corresponds to not more than 1% of the concentration of corrosive constituents in the first region.

The first and second regions may be separated from each other, for example, by a sealing element. Depending on the application of the transducer with regard to the temperature and pressure ranges a metal seal such as a copper seal, a seal made of 1.4404 or 1.4301 grade steels, a sealing element made of a metal alloy or metal-coated seals made of a metal alloy may be used. For certain temperature and pressure ranges also plastic seals are known, for example made of polytetrafluoroethylene, fluoroelastomers or nitrile compounds. Other materials may also be used for the sealing element.

The transducer is preferably used to determine a pressure of a fluid medium when the fluid medium is corrosive and conventional transducers cannot be used.

It is particularly preferred that the transducer is used to determine the pressure of a fluid medium which contains at least a proportion of molecular or atomic hydrogen. Hydrogen is known to cause so-called hydrogen embrittlement in a large number of metallic materials which leads to hydrogen embrittlement and a reduction in yield strength under thermal and/or mechanical stress. A transducer as described above significantly reduces these disadvantages.

All embodiments described of a transducer may be designed as an embodiment where a pressure transmission medium is arranged in the second space. However, all embodiments described may also be designed without a pressure transmission medium arranged in the second space.

The invention also comprises a transducer for determining a temperature of a fluid medium. The transducer comprises a pressure side end that faces the fluid medium. The transducer comprises a housing. The transducer comprises a measuring arrangement for determining a temperature of a fluid medium. The measuring arrangement is arranged inside the housing. The transducer comprises a diaphragm that is designed according to any of the embodiments described above.

BRIEF DESCRIPTION OF THE SEVERAL VIEWS OF EXEMPLARY DRAWINGS

In the following, the invention is explained in more detail by way of example with reference to the figures in which.

Throughout the figures, identical reference numerals refer to identical features.

DETAILED DESCRIPTION OF EXEMPLARY EMBODIMENTS OF THE INVENTION

Figure 1:
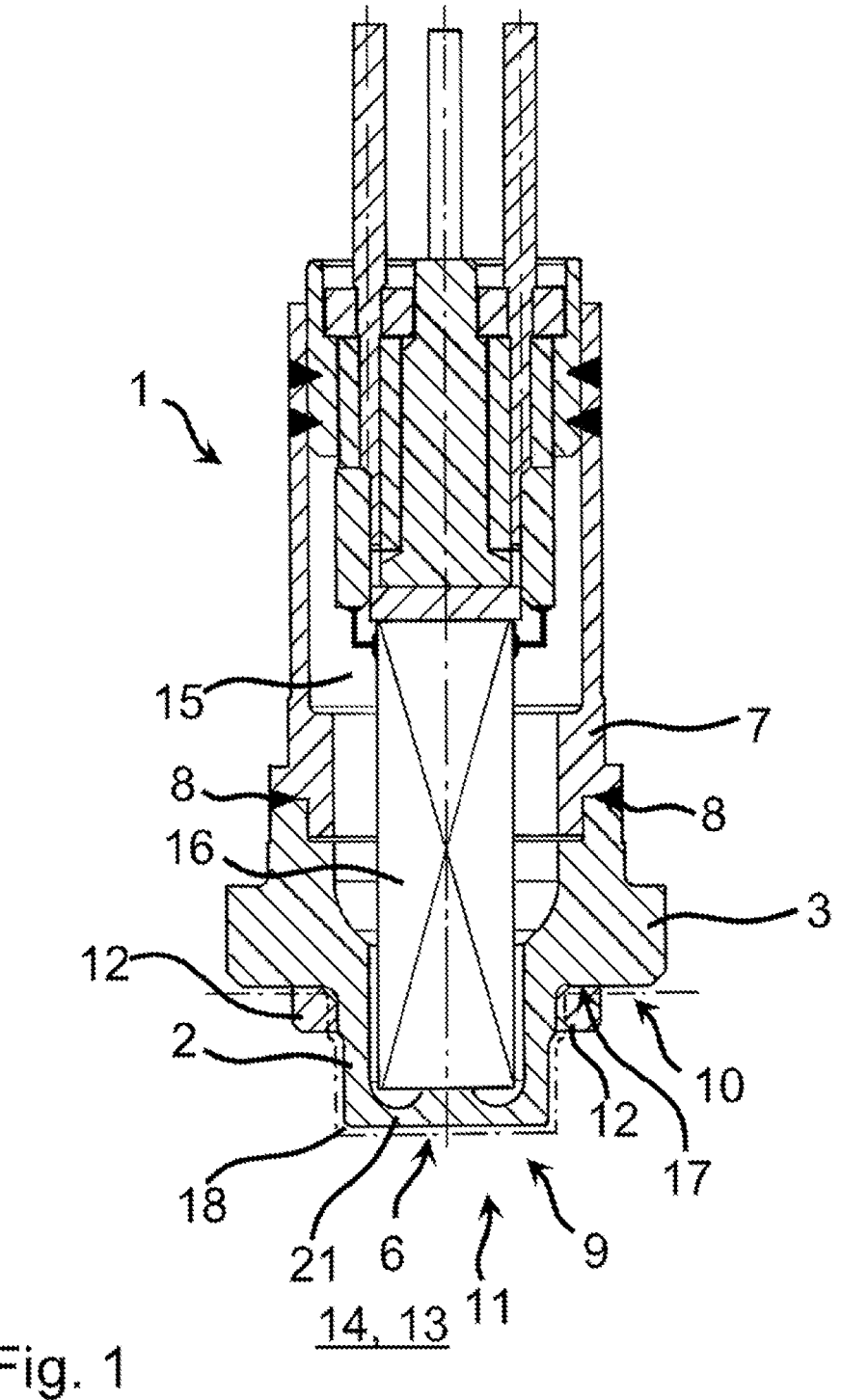
FIG. 1 shows a schematic sectional view of an embodiment of a transducer with an embodiment of a diaphragm according to the invention.
Figure 2:
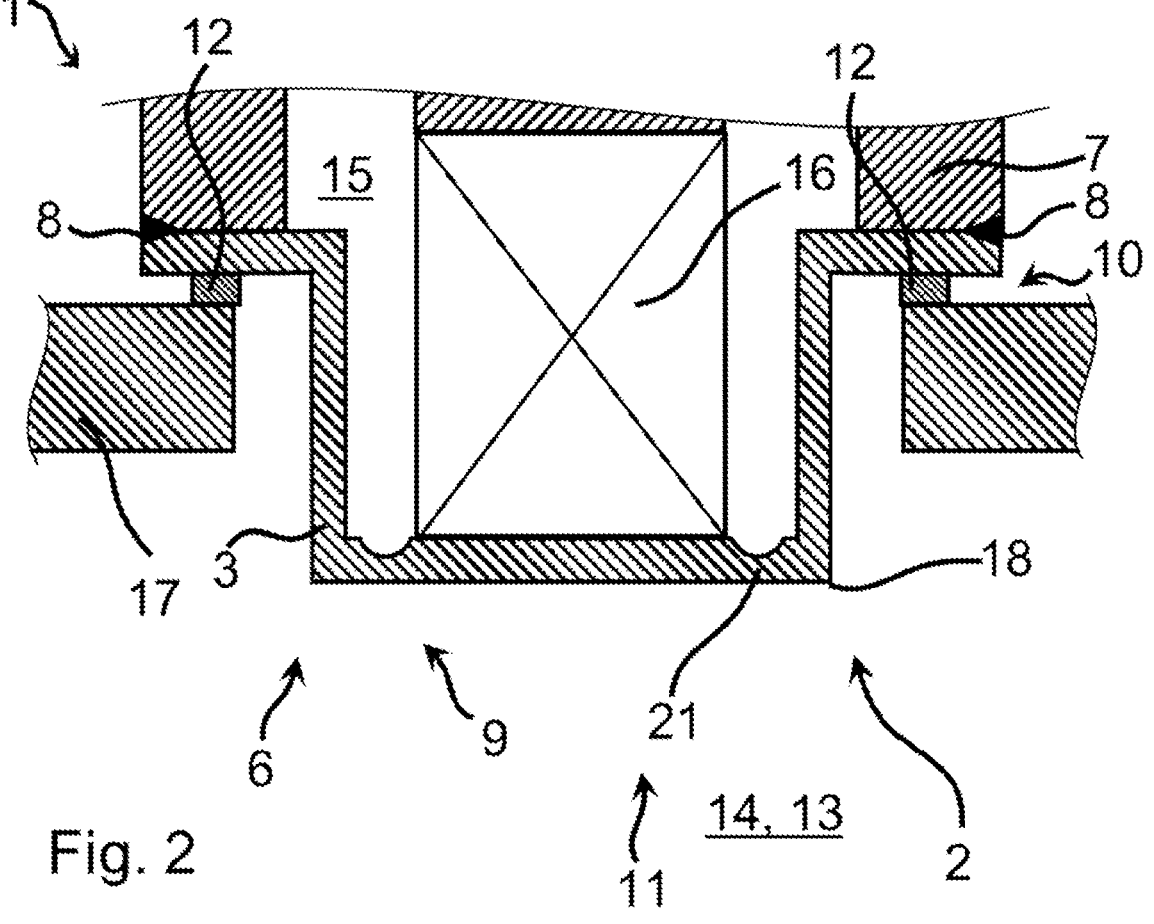
FIG. 2 shows a schematic partial view of a sectional view of a transducer with a diaphragm according to FIG. 1 which is arranged in a wall.

FIGS. 1 and 2 each show a schematic sectional view of an embodiment of a transducer 1 comprising a diaphragm 2. The transducer 1 is suitable for determining a pressure of a fluid medium 13. The transducer 1 comprises a pressure side end 11 facing the fluid medium. The transducer 1 comprises a housing 7. A measuring arrangement 16 is arranged inside the housing 7.

The diaphragm 2 is arranged at the pressure side end 11 of the transducer 1 and hermetically separates the measuring arrangement 16 from the fluid medium 13.

In the representation of FIG. 1, which is not drawn to scale, an optional coating of the metallic material 3 is shown as a dot-dashed line.

FIG. 2 shows a further embodiment of a diaphragm. In both Figures, the thickness of the diaphragm 2 is not drawn to scale for better clarity.

The diaphragm 2 of FIGS. 1 and 2 comprises a metallic material 3 and hermetically separates a first space 14 from a second space 15. In the first space 14 is arranged a fluid medium 13 at least one physical variable of which can be determined. A physical variable is a pressure and/or a temperature, for example.

The diaphragm 2 comprises a first region 9 which is in contact with the fluid medium 13 when the diaphragm 2 is in use. The diaphragm 2 comprises a second region 10 which during use is not in contact with the fluid medium 13, as shown in FIGS. 1 and 2.

The surface 6 of the diaphragm 2 which is in direct contact with the fluid medium 13 during use advantageously has a corrugation wherein the notch stress caused by this corrugation is less than 1500 MPa. The surface of the diaphragm is shown in FIGS. 1 and 2. Transitions between two non-parallel planes have radii 18 of at least 100 μm and/or facets 18 of at least 30 μm.

The housing 7 and the diaphragm 2 of the transducer 1 are connected by a material bonding connection 8. The diaphragm 2 comprises a first region 9 which is in contact with the fluid medium 13 during use. The diaphragm 2 comprises a second region 10 which is not in contact with the fluid medium 13 during use. The first region 9 and second region 10 are separated from each other by a sealing element 12 when the transducer 1 is in use. In each of the embodiments shown, the material bonding connection 8 is positioned in the second region 10.

However, it is also conceivable to arrange the material bonding connection 8 in a region which is in contact with the fluid medium 13 when the diaphragm 2 is in use. In this case, the material bonding connection 8 is advantageously completely covered by the coating 4 (not shown).

FIG. 2 shows the transducer 1 for determining a pressure of a fluid medium 13 inserted into a wall 17. The wall 17 may be, for example, a wall 17 of a storage tank for a fluid medium 13, of a compressor, a heat pump, a refrigerating machine, a pipe for a fluid medium 13, of a combustion chamber of an internal combustion engine or of a gas turbine.

Figure 3:
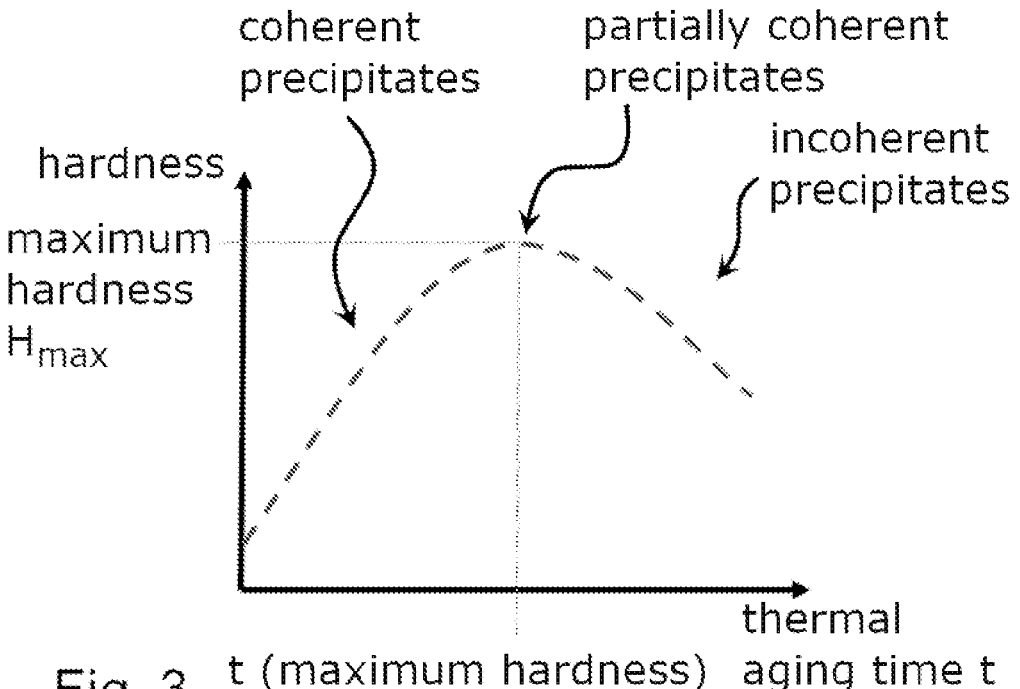
FIG. 3 shows a schematic representation of a diagram in which hardness is plotted against the thermal aging time of a material at a given temperature.

FIG. 3 schematically shows the relationship of the hardness of a metallic material, for example a precipitation-hardening martensite, as a function of the thermal aging time t at a specific aging temperature. The hardness increases with increasing thermal aging time up to a global maximum where maximum hardness is reached and then decreases again. The thermal aging time is a specified time that indicates the duration of the thermal treatment at a specific temperature. The maximum hardness $H_{max}$ of a material is reached at a thermal aging time t (maximum hardness). So-called partially coherent precipitates are present at this maximum hardness $H_{max}$. Incoherent precipitates are present with longer thermal aging times. Preferentially, the precipitates form at grain boundaries within the material as described in Metallkunde, E. Hornbogen and H. Warlimont, 4th edition, Springer Verlag 2001.

It is, of course, possible to combine the embodiments of the transducer 1 or the diaphragm 2 disclosed in this document with each other. Explicitly included in this document are also embodiments which comprise a combination of the features of embodiments described herein.

LIST OF REFERENCE NUMERALS 1 transducer
2 diaphragm
3 metallic material
6 surface
7 housing
8 material bonding connection

9 first region
10 second region
11 pressure side end
12 sealing element
13 fluid medium
14 first space
15 second space
16 measuring arrangement
17 wall
18 phase/facet/curvature
21 thin-walled region

What is claimed is:

1. A system for determining a pressure of a hydrogen-containing fluid medium, the system defining a main axis and comprising:
a hydrogen-containing fluid medium disposed in a first space;
a transducer that includes:
a pressure side end configured to be disposed to face the fluid medium and including a metallic diaphragm extending in a plane generally normal to the main axis;
a housing, which defines a second space;
a measuring arrangement disposed in the second space;
wherein the diaphragm is configured and disposed for hermetically separating the first space from the second space;
wherein the diaphragm defines a thickness measured parallel to the main axis and includes a metallic material made of a high-alloy martensite;
wherein the content of the metallic material includes more than 5% by weight of at least one of the elements chromium or molybdenum or nickel;
wherein the thickness of the diaphragm does not exceed 500 micrometers; and
wherein the metallic material of the diaphragm has an average grain size of less than 20 μm.

2. The transducer according to claim 1, wherein the metallic material of the diaphragm is made of a high-alloy martensite with partially coherent precipitates.

3. The transducer of claim 1, wherein the metallic material of the diaphragm is made of a high-alloy lath martensite with partially coherent precipitates.

4. The transducer of claim 1, wherein the metallic material is resistant to hydrogen corrosion; and wherein the metallic material is not permeable to atomic hydrogen with a leakage rate of the diaphragm for hydrogen of less than $10^{-6}$ mbar l/s, and wherein the diaphragm thickness is at most 500 μm.

5. The transducer of claim 1, wherein the metallic material of the diaphragm has a chromium content of at least 10% by weight.

6. The transducer of claim 1, wherein the metallic material of the diaphragm is configured to be suitable for the production of thin-walled diaphragms with geometric dimensions of thickness less than 500 μm.

7. The transducer of claim 1, wherein the metallic material of the diaphragm has a residual austenite content of between 0% and 30% by volume.

8. The transducer of claim 7, wherein the metallic material of the diaphragm has a residual austenite content greater than 1% by volume.

9. The transducer of claim 1, wherein the metallic material of the diaphragm has a yield strength of at least 600 MPa and at most 1500 MPa.

10. The transducer of claim 1, wherein the metallic material of the diaphragm has a chromium content of at least 10% by weight and a nickel content of at least 4% by weight; and wherein the proportion by weight of non-metals is less than 0.20% by weight; and wherein the material of the diaphragm has a coefficient of thermal expansion between $10 \cdot 10^{-6}$ $K^{-1}$ and $11.3 \cdot 10^{-6}$ $K^{-1}$, in the temperature range between 20° C. and 100° C.

11. The transducer of claim 1, wherein the diaphragm defines a corrugation in a surface of the metallic material configured and disposed to face the fluid medium in the first space; wherein a notch stress attributable to the corrugation is less than 1500 MPa, or wherein the corrugation is defined by transitions between two non-parallel planes, and wherein the transitions have radii of at least 100 μm and/or facets of at least 30 μm.

12. The transducer of claim 1, wherein the diaphragm defines a surface quality at least in a region which is configured to be disposed in contact with the fluid medium in the first space during use with a mean roughness index Ra of less than 0.8 μm.

13. The transducer of claim 1, wherein the metallic material of the diaphragm has a hardness according to Rockwell C between 38 and 50 HRC.

14. The transducer of claim 1, wherein the housing and the diaphragm are connected by a material bonding connection; wherein the diaphragm has a first region which is configured to be in contact with the fluid medium during use; wherein the diaphragm has a second region which is configured so as not to be in contact with the fluid medium during use; and wherein the material bonding connection is positioned in the second region.

15. The transducer according to claim 1, wherein the metallic material of the diaphragm is made of a high-alloy martensite with partially incoherent precipitates.

16. The transducer of claim 1, wherein the metallic material of the diaphragm is made of a high-alloy lath martensite with partially incoherent precipitates.

17. The transducer of claim 1, wherein the metallic material of the diaphragm has a residual austenite content of between 0% and 10% by volume.

18. The transducer of claim 17, wherein the metallic material of the diaphragm has a residual austenite content greater than 1% by volume.

19. The transducer of claim 1, wherein the metallic material of the diaphragm is of quenched and tempered grade 1.4418 steel having a yield strength of less than or equal to 900 MPa at room temperature; and wherein the material of the diaphragm has a coefficient of thermal expansion between $10 \cdot 10^{-6}$ $K^{-1}$ and $11.3 \cdot 10^{-6}$ $K^{-1}$, in the temperature range between 20° C. and 100° C.

* * * * *